Figure 1:
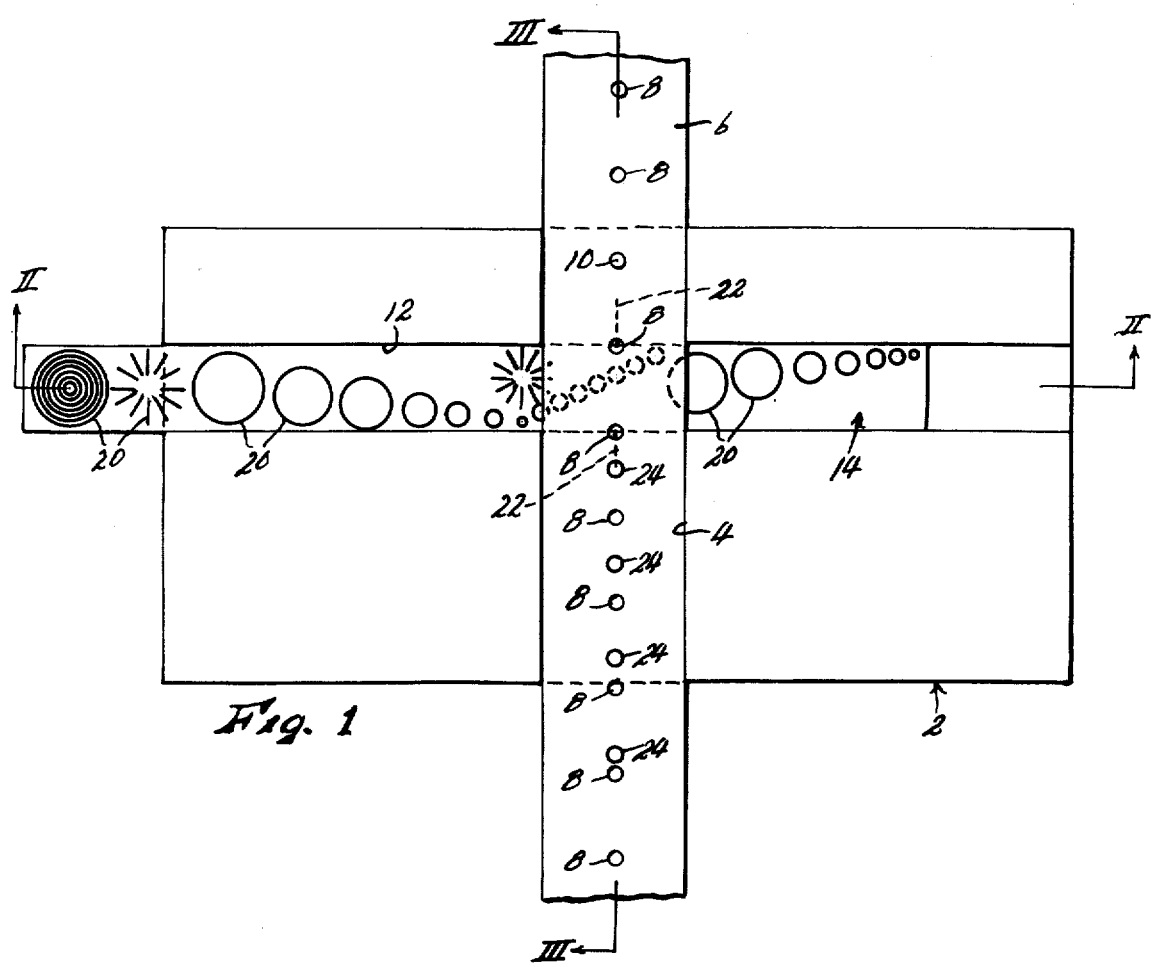

United States Patent [19]
Schmidt

[11] 3,888,571
[45] June 10, 1975

[54] MOTION PICTURE TOY

[76] Inventor: John C. Schmidt, 2307 Castilla Isle, Fort Lauderdale, Fla. 33301

[22] Filed: May 8, 1974

[21] Appl. No.: 468,073

[52] U.S. Cl. .................... 352/87; 352/50; 350/121
[51] Int. Cl. ........................................... G03b 21/32
[58] Field of Search ............ 352/50, 52, 87; 350/121

[56] References Cited
UNITED STATES PATENTS

| 1,198,598 | 9/1916 | Sudmann | 352/52 |
| 1,633,547 | 6/1927 | Hurd | 352/87 |
| 2,149,779 | 3/1939 | Kroner | 352/52 X |

Primary Examiner—Monroe H. Hayes
Attorney, Agent, or Firm—John A. Hamilton

[57] ABSTRACT

A toy for producing hand-drawn motion picture films consisting of a board having a groove formed in the top surface thereof through which a film tape on which images may be drawn is passed, the tape having perforations formed therein selectively engageable over a pin fixed in the board so that the tape can be advanced one frame at a time, the tape being at least semitransparent, and image members carried by the board beneath the tape, and viewable through the tape to serve as guides for drawing images on the tape. The image member may constitute either a master design prepared by the manufacturer, or may constitute an image of the picture drawn on the next preceding frame of the tape.

4 Claims, 5 Drawing Figures

MOTION PICTURE TOY

This invention relates to new and useful improvements in motion picture devices of the toy class, and has as its principal object the provision of a device whereby a motion picture "film", consisting preferably of a paper tape, can be produced by handdrawing images in successive sections or "frames" of said tape. The drawings in the successive frames of the tape of course represent successive segments of the motion being depicted. Viewers and projectors by means of which films thus prepared can be viewed or projected are already commercially available, and in and of themselves form no part of the present invention.

Another object is the provision of a device of the character described which, while usable even by a child to create films, in that images may be traced onto the film tape from master strips prepared by the manufacturer, nevertheless provides the child with ample opportunity for creativity and originality as his skill develops, for example by combining images from more than one master strip in various combinations.

A further object is the provision, in a modification of the device, of means permitting complete originality of the film being created, each frame being dictated solely by the user's artistic ability, but which nevertheless presents an image of the previously drawn frame beneath and visible through the next successive frame of the tape, in order to serve as a guide and aid in the drawing of said next frame.

Other objects are extreme simplicity and economy of structure, and efficiency and dependability of operation.

Figure 2:
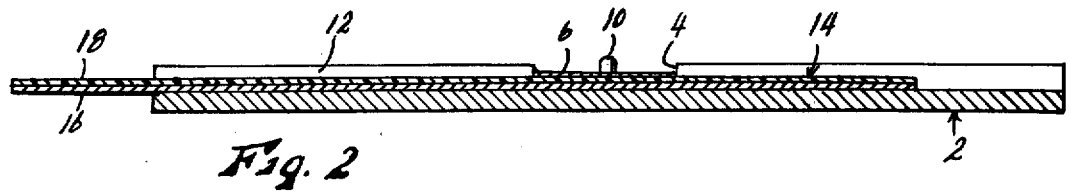
Figure 3:
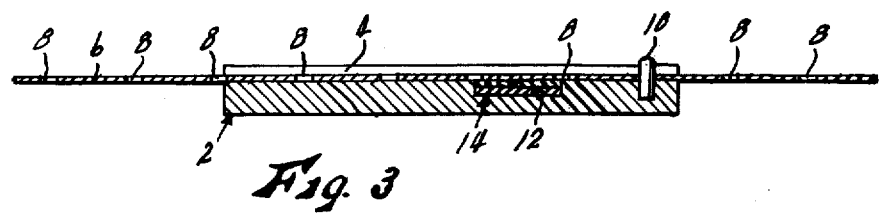
Figure 4:
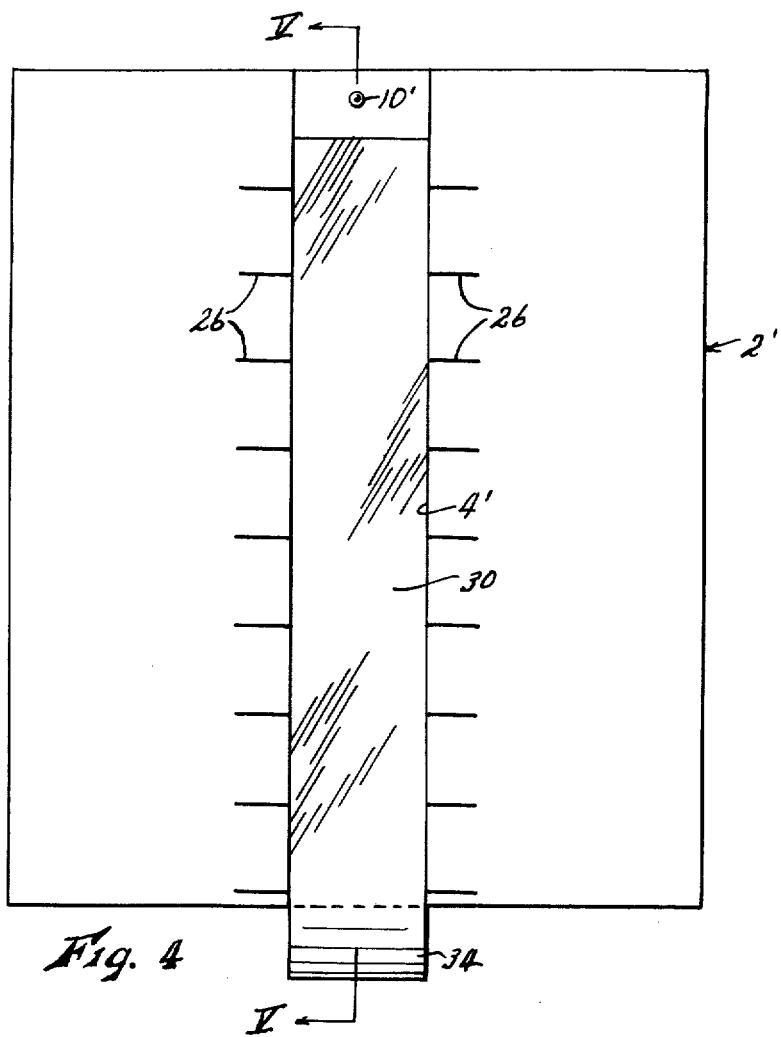
Figure 5:
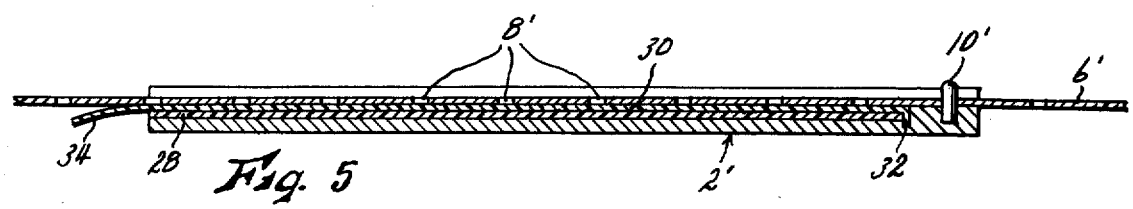

With these objects in view, as well as other objects which will appear in the course of the specification, reference will be had to the accompanying drawing, wherein:

FIG. 1 is a top plan view of a motion picture device embodying the present invention, with a film tape shown in operative relation thereto, FIG. 2 is a sectional view taken on line II—II of FIG. 1, FIG. 3 is a sectional view taken on line III—III of FIG. 1, FIG. 4 is a top plan view of a modified form of the the device, with the film tape omitted, and FIG. 5 is a sectional view taken on line V—V of FIG. 4, including the tape.

Like reference numerals apply to similar parts throughout the several views, and in the form of the device shown in FIGS. 1–3, the numeral 2 applies to a planar base member which may be formed of wood or any other suitable material. Formed in the top surface of said base, and extending all the way across it, is a shallow tape groove 4. The floor of said groove is planar, and said groove is adapted to position a film tape 6 in its movement across the base. Said tape is formed preferably of paper, of at least a semi-transparent character. It may of course be of any desired length. The images are to be drawn on the successive "frames" of the tape, said frames constituting successive longitudinally spaced portions of said tape, and each frame being rectangular. Said tape has a continuous series perforations 8 formed therethrough, successive perforations being spaced apart longitudinally of the tape by a distance equal to the predetermined length of a single "frame" of the tape. Adjacent one edge of the base, a rounded pin 10 is fixed therein and projects upwardly for engagement selectively in perforations 8 of the tape. Thus as the tape is moved to engage successive perforations 8 over pin 10, the tape is moved through groove 4 in a series of steps each equal to the length of a single tape frame longitudinally of the tape. This is a manual operation.

Formed in the top of base 2 at right angles to groove 4 is a master strip groove 12, also extending all the way across the base. The depth of groove 12 exceeds the depth of groove 4 by the thickness of a master image strip 14 which is disposed longitudinally and slidably in groove 12. As best shown in FIG. 2, master strip 14 may be of double thickness, including a bottom layer 16 of metal, for strength, and a top layer 18 of a softer plastic or the like which may be easily engraved. The top surface of strip 14 is flush with the bottom surface of groove 4, so that tape 6 moves smoothly over strip 14. Layer 18 of the master strip has any suitable design images 20 engraved therein, the lines of the design images being of a color contrasting sharply with the background color of the strip, such as dark lines on a light background. For this purpose, layer 18 of the strip could consist of a very thin surface layer of white plastic bonded over a sub-layer of black plastic, and the engraving of the lines could be sufficiently deep to cut through the surface layer, so that the images appear as black lines on a white background. Groove 12 is spaced apart laterally from pin 10 by such a distance that master strip 14 lies beneath a portion of tape 6 corresponding precisely to one "frame" of said tape. The design 20 on the master strip actually shown are simple geometric shapes designed, as will appear, to produce films showing receding or approaching balls, a bouncing ball, exploding stars and the like, but it will be readily understood that in a kit which would ordinarily be sold by the manufacturer, several master strips would be furnished, and that these strips could include designs representing animals, humans, cartoon characters, or nearly anything else, with successive images representing successive segments of some motion to be depicted.

In the operation of this form of the device, a master strip 14 carrying the desired images is first laid in groove 12, and a film tape 6 is laid in groove 4 so as to overlie the master strip in intersecting relation thereto, with one of perforations 8 of said tape engaged over pin 10. Master strip 14 is then moved slidably along groove 12 until the desired image 20 of said master strip is centered beneath the tape. Indicia marks 22 imprinted on the floor of groove 4, at the midline thereof and adjacent the opposite edges of groove 12, are of assistance in accurately centering the desired image relative to the tape.

The image 20 thus centered relative to tape 6 will then be visible through the tape, due to the semi-transparent nature of the tape, at least as long as the tape is pressed firmly against the master strip, and can be traced onto the tape with a pencil, ballpoint pen or the like. The contrasting color of the master strip image lines to the background color of said strip makes the lines visible for tracing purposes. Also, if the design lines are engraved into the master strip, the paper of the tape can be indented into the line grooves, so that the pencil or pen point is mechanically guided. This renders the device suitable for use even by young children.

When the tracing of one design image is completed, tape 6 is advanced to engage the next successive perforation 8 thereof over pin 10. This places the next successive "frame" of the tape over the master strip. The master strip 14 is then moved in groove 12 to center the image 20 thereof representing the next segment of motion under tape 6, and that image is traced onto the tape. The process is repeated to produce a film tape of any desired length. In FIG. 1, the tape shows a series of circular designs 24 traced thereon, which will, if continued in proper sequence, appear as a bouncing ball when the tape is later properly viewed or projected. The traced images on the tape may also be colored by crayon, colored pencils, ink or the like if desired.

The film tape thus prepared may be viewed in different ways. For example, viewers are commercially available through which the tape may be advanced beneath a viewing aperture so as to expose one frame at a time to view through said aperture. Reflector type projectors are also available which will project a light beam reflected from successive frames of the tape onto a projection screen. It will be understood that in such viewers or projectors the tape is always advanced intermittently by a "star wheel" drive or the like so that the tape comes to a mementary halt as each successive frame of the tape is fully exposed, in order to provide a visually retentive image in the eye of the spectator. This feature is universal in all motion picture projectors. Also, the ends of the tape can be glued or otherwise secured together to form an endless loop which can be run continuously and repeatedly through a viewer or projector. In this manner a single motion produced by tracings on the tape will appear to be repeated as long as desired when viewed. In such a viewer or projector, the tape is driven by a sprocket wheel having teeth engageable in the perforations 8 of the tape. However, since the present invention involves only means for producing the images on the tape, as shown, and not to the eventual display thereof, the particular viewer or projector utilized for eventual showing of the tape is not pertinent to the present invention, and is not shown.

While the device as thus far shown utilizes designs traced from master strips, it still permits a high degree of originality and creativity on the part of the user, by different combinations, in a single frame of the tape, of images selected from different master strips. For example, the "bouncing ball" motion illustrated could be combined with the figure of a child having a simple vertical arm motion, so that the child would appear to be bouncing the ball, or the ball could be made to move horizontally, and combined with the images of two children so that they would appear to be playing "catch" with the ball. With a relatively few master strips showing carefully selected motion segments of objects, persons, animals, etc., the possible combinations and variations become almost unlimited.

FIGS. 4 and 5 show another form of the device which is better suited for use by persons having a greater degree of artistic talent, or more experience. In this form the base 2' is formed with a tape groove 4' for receiving and guiding a film tape 6', which has perforations 8' formed therein for engaging successively over a pin 10' fixed in the base, all as in FIGS. 1-3. However, this species does not utilize a master strip, and the master strip groove 12 of FIGS. 1-3 is therefore omitted. Groove 4' is of such length as to contain a number (8 as shown) of "frames" of the tape, the span of each frame relative to pin 10', being indicated by indicia marks 26 imprinted, on the base adjacent groove 4'. The base or "floor" of groove 4' constitutes a "magic slate" of well known design, consisting of a bottom layer 28 of a plastic or the like of dark color, and of such consistency that its exposed top surface is always somewhat sticky or "tacky", overlaid by a flexible plastic strip 30, usually of a milky, translucent color. Layer 28 and strip 30 cover the full width of the floor of groove 4' along a major portion of its length. Strip 30 is fixed at one end in base 2' adjacent pin 10', as at 32, and projects outwardly from the opposite end of the groove to form a finger tab 34. Strip 30 will not ordinarily adhere to tacky layer 28, and therefore appears substantially white. However, when pressed very firmly against layer 28 with a substantial localized pressure, as by a stylus, it will adhere to layer 28, and in the area of such adhesion, the color of layer 28, usually dark as compared to the normally generally white color of strip 30, will show through said strip, recording the path of the stylus as a dark line on a white background. The image may be "erased" simply by peeling strip 30 away from layer 28 by lifting finger tab 34. Such "magic slates" are common and well known as children's toys.

In the operation of this form of the device, tape 6 is laid in groove 4' with one of its perforations engaged over pin 10'. The user, employing a pencil or ballpoint pen, draws a completely original first image on the tape within one "frame" thereof, as said frames are designated by indicia marks 26, say for example that frame closest to pin 10. At the same time, the first image just drawn is duplicated on the film 30 of the magic slate disposed beneath the tape, the drawing instrument acting as a stylus for this purpose. The tape is then advanced one frame, say to the left as viewed in FIG. 5, by engaging the next successive tape perforation over pin 10'. The duplicate magic slate image will then be displayed under the next successive frame of the tape, and may be used as a guide for drawing a second image depicting the next successive motion segment onto the tape. This is not a tracing, since the second image must be drawn in a slightly different position from the first image, but the duplicate magic slate image is an invaluable aid as a guide to insure the best possible continuity and flow of motion. The tape is then advanced one more frame disposing the second tape image over the next "frame" of the magic slate, and the second tape image is traced onto the magic slate, again by use of a pen or pencil, or by a stylus. The tape is advanced one more frame, disposing the third tape frame over the magic slate duplicate of the second image, which is again used as a guide only in drawing the third image onto the tape. This process is repeated until all of the frames of the magic slate have been used, at which time slate film 30 may be lifted from tacky layer 28 to clear the slate of all images, and the procedure repeated. The film tape used in this form of the invention may be identical to that used with the species of FIGS. 1-3, and the tape may be displayed with the same types of viewers or projectors. This form of the invention requires a greater degree of artistic talent than the species of FIGS. 1-3, relying on original drawings rather than originality and imagination in the combining of preformed images, but its possibilities for giving expression to talent of any degree are correspondingly unlimited.

While I have shown and described certain specific embodiments of my invention, it will be readily apparent that many minor changes of structure and operation could be made without departing from the spirit of the invention.

What I claim as new and desire to protect by Letters Patent is:

1. A device for assisting in the production of hand-drawn images on a flexible, at least semi-transparent motion picture film tape in successively longitudinally spaced apart areas, or "frames" thereof, said device comprising:
   a. a generally planar base having a groove formed in one face thereof having a width corresponding to that of said tape, and through which said tape may be advanced longitudinally to dispose each successive frame thereof over a specified area of the floor of said groove,
   b. locator means operable to position any selected frame of said tape accurately over said specified area of the floor of said groove, and
   c. an image display means carried by said base and operable to display a pre-formed image in said specified area of the floor of said groove, said pre-formed image being viewable through said tape to serve as a guide for hand-drawing an image on the frame of said tape overlying said specified area, said image display means comprising duplicating means covering the floor of said tape groove to reproduce a veiwable duplicate of an image hand-drawn on said tape as it overlies said duplicating means, whereby after one image is so hand-drawn and duplicated, the next successive frame of said tape may be positioned over said duplicate image, so that the latter may serve as a guide for hand-drawing an image on said next successive tape frame.

2. A device as recited in claim 1 wherein said tape groove is of sufficient length to contain a series of frames of said tape, said base having indicia thereon designating lengths of said tape groove corresponding to successive frames of said tape, and said locator means being operable to position any selected frame of said tape in registering relation with any selected length of said groove designated by said indicia, said duplicating means occupying the floor of said tape groove in all portions thereof designated by said indicia.

3. A device as recited in claim 1 wherein said duplicating means includes means for quickly eradicating any duplicate images appearing thereon.

4. A device as recited in claim 1 wherein said duplicating means comprises:
   a. a bottom layer of slightly tacky material covering the floor of said tape groove, and
   b. a flexible, at least semi-transparent film overlying said bottom layer and underlying said tape, and of a color contrasting sharply to that of said bottom layer, said film not normally adhering to said bottom layer but being adherable thereto by substantial pressure thereagainst, as by the pressure of a drawing instrument used to draw images on said tape, whereby said film is adhered to said bottom layer along the lines of said drawing so that the color of said bottom layer shows through said film in an image viewable through said tape, the images appearing on said film being eradicable by peeling said film away from said bottom layer.

* * * * *